US011598434B2

(12) United States Patent
Rhodes et al.

(10) Patent No.: US 11,598,434 B2
(45) Date of Patent: Mar. 7, 2023

(54) UMBRELLA CHECK VALVE ASSEMBLY HAVING RETENTION PLATE

(71) Applicant: Life Technologies Corporation, Carlsbad, CA (US)

(72) Inventors: Charles R. Rhodes, Preston, ID (US); Jonathan O. Schultz, Hyrum, UT (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 0 days.

(21) Appl. No.: 17/147,586

(22) Filed: Jan. 13, 2021

(65) Prior Publication Data

US 2021/0222784 A1 Jul. 22, 2021

Related U.S. Application Data

(60) Provisional application No. 62/962,589, filed on Jan. 17, 2020.

(51) Int. Cl.
*F16K 15/14* (2006.01)
(52) U.S. Cl.
CPC ................. *F16K 15/148* (2013.01)
(58) Field of Classification Search
CPC . F16K 15/148; F16K 7/16–17; Y10T 137/789
See application file for complete search history.

(56) References Cited

U.S. PATENT DOCUMENTS

| 4,513,784 A | 4/1985 | Farrand et al. |
| 4,898,581 A * | 2/1990 | Iwatschenko ........... A61M 5/36 |
| | | 137/854 |
| 4,904,236 A * | 2/1990 | Redmond ........... A61M 27/006 |
| | | 137/854 |

(Continued)

FOREIGN PATENT DOCUMENTS

| DE | 10 2017 209 518 A1 | 12/2018 |
| EP | 1679459 A1 | 7/2006 |

(Continued)

OTHER PUBLICATIONS

International Search Report and Written Opinion received for PCT Patent Application No. PCT/US21/13468, dated Apr. 21, 2021, 17 pages.

*Primary Examiner* — Kevin F Murphy
(74) *Attorney, Agent, or Firm* — Mintz, Levin, Cohn, Ferris, Glovsky and Popeo, P.C.

(57) ABSTRACT

A check valve assembly includes a first port fitting and a second port fitting with a base secured therebetween. The base has an annular sleeve encircling a seat, the seat having a central mounting hole and one or more flow channels passing therethrough. An umbrella valve includes a flexible sealing disk having an outer surface and an opposing inner surface, a mounting stem extending from the inner surface and projecting into the mounting hole of the base, the sealing disk being movable between a first position wherein at least a portion of the sealing disk sits on the seat so as to cover the one or more flow channels and a second position wherein the sealing disk is resiliently flexed so as to at least partially uncover the one or more flow channels. A retention plate is disposed between first port fitting and the seat of the base so that the retention plate sits against the outer surface of the sealing disk.

27 Claims, 11 Drawing Sheets

(56) References Cited

U.S. PATENT DOCUMENTS

| | | | |
|---|---|---|---|
| 4,986,310 A * | 1/1991 | Bailey | F16K 15/148 |
| | | | 137/859 |
| 5,065,575 A | 11/1991 | Cook et al. | |
| 5,507,318 A | 4/1996 | Israelsen | |
| 5,993,425 A | 11/1999 | Kriesel | |
| 6,571,753 B1 | 6/2003 | Jaeger | |
| 6,582,211 B2 | 6/2003 | Wallis et al. | |
| 6,874,656 B2 | 4/2005 | Rohr et al. | |
| 7,029,103 B2 | 4/2006 | Iida | |
| 7,438,090 B2 * | 10/2008 | Steele | F16K 15/141 |
| | | | 137/854 |
| 7,757,704 B2 * | 7/2010 | Lien | F16L 37/38 |
| | | | 285/308 |
| 7,985,574 B2 * | 7/2011 | Brahmbhatt | B01F 3/04262 |
| | | | 435/243 |
| 8,128,385 B2 * | 3/2012 | Takemi | F04B 39/1013 |
| | | | 137/856 |
| 8,337,470 B2 | 12/2012 | Prasad et al. | |
| 9,416,986 B2 | 8/2016 | Huber | |
| 10,146,234 B2 | 12/2018 | Powers et al. | |
| 2008/0314459 A1 * | 12/2008 | Inoue | F04B 39/108 |
| | | | 137/528 |
| 2011/0284105 A1 | 11/2011 | Lien | |
| 2017/0027118 A1 | 9/2017 | Fuller et al. | |

FOREIGN PATENT DOCUMENTS

| | | |
|---|---|---|
| EP | 2111898 A2 | 10/2009 |
| WO | 91/10853 A1 | 7/1991 |
| WO | 2013/178264 A1 | 12/2013 |

* cited by examiner

UMBRELLA CHECK VALVE ASSEMBLY HAVING RETENTION PLATE

CROSS-REFERENCE TO RELATED APPLICATIONS

This application claims the benefit of U.S. Provisional Application No. 62/962,589, filed Jan. 17, 2020, which is incorporated herein by specific reference.

BACKGROUND OF THE DISCLOSURE

1. The Field of the Disclosure

The present disclosure relates to umbrella check valve assemblies and, more specifically, to umbrella check valve assemblies having a retention plate for securing the umbrella valve in place.

2. The Relevant Technology

Umbrella check valves are one form of check valve that can be used to control the flow of a fluid through a line or device. Specifically, an umbrella check valve enables a fluid to freely flow in one direction of a line or device but is self-sealing so as to prevent the flow of fluid in the opposite direction. Umbrella check valves commonly include an umbrella valve that operates on a seat through which a fluid flows. The seat has a central mounting hole extending therethrough and a spaced apart flow channel extending therethrough. The umbrella valve is made of a resiliently flexible material and includes an annular sealing disk and a mounting stem that centrally projects from a bottom side thereof. The sealing disk is generally domed shaped so that the umbrella valve has the general configuration of an umbrella.

During assembly, the mounting stem of the umbrella valve is pressed into the mounting hole of the seat so that the umbrella valve is secured to the seat by frictional engagement. With the umbrella valve secured to the seat, the sealing disk covers the flow channel with at least the outer perimeter of the umbrella valve biasing in sealed engagement against the seat.

During use, a fluid travels along a flow path and through the flow channel of the seat toward the umbrella valve. Pressure produced by the traveling fluid causes the perimeter edge of the sealing disk to upwardly flex so that the fluid can flow around the umbrella valve and continue along the fluid path. However, as the fluid flow stops, the sealing disk of the umbrella valve resiliently rebounds to again cover the flow channel and seal against the seat. The umbrella valve thus seals the flow channel closed so that the fluid cannot flow in the opposite direction back through the seat.

Proper functioning of umbrella check valves can be critical in some applications. For example, in the pharmaceutical or biopharmaceutical industry, umbrella check valves are used in delivering gas and/or fluids to sterile solutions or suspensions being processed. For example, an umbrella check valve can be used on a gas line that delivers a sparging gas into a bioreactor. The umbrella check valve stops the culture within the bioreactor from flowing through the gas line when sparging is stopped. Failure of the umbrella check valve can result in the culture freely flowing through the gas line and potentially fouling the gas filter and/or gas source. Such fouling can disrupt the production process and potentially result in partial loss or contamination of the culture. Liquid within the gas line can also delay or otherwise disrupt the proper sparging of gas into the bioreactor. Thus, failure of the check valve can disrupt production of the culture or even jeopardize viability.

In other applications, umbrella check valves can be used in dispensing liquid additives into a culture located within a bioreactor. The additive is dispensed by passing through the check valve. In this case, failure of the check valve can cause the culture to flow into the additive upstream of the check valve. This can result in over feeding of the additive into the culture or at least preclude the ability to properly dispense the additive into the culture. Again, failure of the check valve can disrupt production of the culture or even jeopardize viability. Many other problems can also result from the failure of an umbrella check valve.

One of the shortcomings of conventional umbrella check valves is that, under certain conditions, such as under a sudden burst of a fluid at high pressure or having a high viscosity, the fluid can dislodge the umbrella valve from the seat and thereby prevent proper functioning of the check valve. As discussed above, the improper functioning of the check valve can result in detrimental consequences in many applications. Accordingly, what is needed in the art are improved umbrella check valves that have a reduced risk of separation of the umbrella valve from the seat during operation and thus have a reduced risk of failure or improper functioning. Other improvements over conventional umbrella check valves is also desired.

SUMMARY OF THE DISCLOSURE

Various independent aspects and examples consistent with the present teaching are set out in the following numbered clauses:

Clause 1: A check valve assembly comprising:
a first port fitting having a tubular stem with a passage extending therethrough;
a second port fitting having a tubular stem with a passage extending therethrough;
a base secured between the first port fitting and the second port fitting, the base comprising an annular sleeve encircling a seat, the seat having a central mounting hole passing therethrough and one or more flow channels passing therethrough;
an umbrella valve comprising a flexible sealing disk having an outer surface and an opposing inner surface, a mounting stem extending from the inner surface of the sealing disk and projecting into the mounting hole of the base, the sealing disk being movable between a first position wherein at least a portion of the sealing disk sits on the seat of the base so as to cover the one or more flow channels and a second position wherein the sealing disk is resiliently flexed so as to at least partially uncover the one or more flow channels; and
a retention plate disposed between first port fitting and the seat of the base so that the retention plate sits against or adjacent to the outer surface of the sealing disk.

Clause 2: The check valve assembly as recited in clause 1, wherein the retention plate terminates at an outer perimeter edge, a gap being formed between the outer perimeter edge of the retention plate and the first port fitting so that fluid flowing from the second port fitting to the first port fitting can pass through the gap.

Clause 3: The check valve assembly as recited in clause 2, wherein the passage of the tubular stem of the first port fitting has a maximum inner diameter and the outer perimeter edge of the retention plate has a maximum outer diameter, the maximum outer diameter of the retention plate being greater than the maximum inner diameter of the passage of the first port fitting.

Clause 4: The check valve assembly as recited in any one of clauses 1-3, wherein the tubular stem of the first port fitting has a first end and an opposing second end with an annular flange outwardly projecting therefrom, the annular flange being secured to the annular sleeve of the base and having a maximum outer diameter that is greater than the maximum outer diameter of the retention plate.

Clause 5: The check valve assembly as recited in any one of clauses 1-4, wherein the retention plate comprises a plate body having a first side and an opposing second side, one or more flow paths pass through the plate body between the opposing sides through which fluid can pass.

Clause 6: The check valve assembly as recited in clause 5, wherein the one or more flow paths comprise a plurality of spaced apart flow paths.

Clause 7: The check valve assembly as recited in clauses 5 or 6, wherein the plate body of the retention plate extends to a perimeter edge, the one of more flow paths comprising one or more holes that pass through and are encircled by the plate body and/or one or more notches recessed into the perimeter edge of the plate body.

Clause 8: The check valve assembly as recited in clauses 1-4, wherein the retention plate comprises a plate body having a first side and an opposing second side, the first side of the plate body sitting against the outer surface of the sealing disk, the retention plate further comprising a plurality of legs projecting from second side of the plate body so that the plurality of legs space the second side of the plate body away from the first port fitting.

Clause 9: The check valve assembly as recited in clause 8, wherein the plurality of legs comprise at least 2, 3, 4, or 5 legs.

Clause 10: The check valve assembly as recited in clause 8 or 9, wherein the tubular stem of the first port fitting has a first end and an opposing second end with an annular flange outwardly projecting therefrom, the annular flange being secured to the annular sleeve of the base.

Clause 11: The check valve assembly as recited in clause 10, wherein each of the plurality of legs terminate at a free end that sits against or is disposed directly adjacent to an inside face of the annular flange of the first port fitting.

Clause 12: The check valve assembly as recited in any one of clauses 1-11, further comprising the umbrella valve having a blind hole extending from the outer surface of the sealing disk and into the mounting stem.

Clause 13: The check valve assembly as recited in clause 12, wherein the retention plate comprises a plate body having a first side facing the umbrella valve and an opposing second side, an alignment stem extending from first side of the plate body and into the blind hole of the umbrella valve.

Clause 14: The check valve assembly as recited in any one of clauses 1-12, wherein the retention plate comprises a plate body having a first side facing the umbrella valve and an opposing second side, the first side of the retention plate being free of any projections outwardly extending therefrom.

Clause 15: The check valve assembly as recited in any one of clauses 1-14, wherein the retention plate is more rigid than the umbrella valve.

Clause 16: The check valve assembly as recited in any one of clauses 1-15, wherein the passage of the stem of the first port fitting has a first maximum diameter and the passage of the stem of the second port fitting has a second maximum diameter, the first maximum diameter being larger than the second maximum diameter.

Clause 17: The check valve assembly as recited in any one of clauses 1-15, wherein the passage of the stem of the first port fitting has a first maximum diameter and the passage of the stem second port fitting has a second maximum diameter, the first maximum diameter being equal to the second maximum diameter.

Clause 18: The check valve assembly as recited in clause 1, further comprising:
 the tubular stem of the first port fitting having a first end with an annular hose barb disposed thereat and an opposing second end with an annular first flange outwardly projecting therefrom, the annular first flange being secured to the annular sleeve of the base and having a maximum first outer diameter; and
 the tubular stem of the second port fitting having a first end with an annular hose barb disposed thereat and an opposing second end with an annular second flange outwardly projecting therefrom, the annular second flange being secured to the annular sleeve of the base and having a maximum second outer diameter.

Clause 19: The check valve assembly as recited in clause 18, wherein the maximum first outer diameter of the first flange is equal to the maximum second outer diameter of the second flange.

Clause 20: The check valve assembly as recited in any one of clauses 1-19, wherein the first port fitting is secured to the annular sleeve of the base by an adhesive or welding.

Clause 21: The check valve assembly as recited in any one of clauses 1-20, wherein the mounting stem of the umbrella valve has a free end with an enlarged head formed thereat, the enlarged head being disposed on a side of the seat that is opposite the sealing disk.

Clause 22: The check valve assembly as recited in any one of clauses 1-21, further comprising a tube coupled to the first port fitting.

Clause 23: The check valve assembly as recited in clause 22, further comprising a bioreactor or fermenter coupled to the tube.

Clause 24: The check valve assembly as recited in clause 1, further comprising means for fluid coupling a first end of the stem of the first port fitting to a fluid line.

Clause 25: The check valve assembly as recited in clause 24, wherein the means for fluid coupling comprises a hose barb disposed at the first end of the stem.

Clause 26: The check valve assembly as recited in any one of clauses 1-25, wherein the retention plate is freely movably relative to the first port fitting, base, and umbrella valve.

Clause 27: The check valve assembly as recited in any one of clauses 1-26, wherein the retention plate is separate and discrete from the first port fitting, base, and umbrella valve and is not integrally formed with or fixedly secured to the first port fitting, base, or umbrella valve.

Clause 28: The check valve assembly as recited in any one of clauses 1-27, wherein the outer surface of the umbrella valve includes a flat platform against which the retention plate sits.

Clause 29: A check valve assembly comprising:
 a first port fitting having a passage extending therethrough;
 a second port fitting having a passage extending therethrough;
 a base comprising a seat having a central mounting hole passing therethrough and one or more flow channels passing therethrough, the base being disposed between the first port fitting and the second port fitting so that fluid flowing from the second port fitting to the first port fitting must pass through the one or more flow channels of the seat;

an umbrella valve comprising a flexible sealing disk having an outer surface and an opposing inner surface, a mounting stem extending from the inner surface of the sealing disk and projecting into the mounting hole of the base, the sealing disk being movable between a first position wherein at least a portion of the sealing disk sits on the seat of the base so as to cover the one or more flow channels and a second position wherein the sealing disk is resiliently flexed so as to at least partially uncover the one or more flow channels; and a retention plate disposed between first port fitting and the seat so that the retention plate sits against or adjacent to the outer surface of the sealing disk, the retention plate terminating at an outer perimeter edge, a gap being formed between the outer perimeter edge and the first port fitting so that fluid flowing from the second port fitting to the first port fitting can pass through the gap.

Clause 30: The check valve assembly as recited in clause 29, wherein the passage of the first port fitting has a maximum inner diameter and the outer perimeter edge of the retention plate has a maximum outer diameter, the maximum outer diameter of the retention plate being greater than the maximum inner diameter of the passage of the first port fitting.

Clause 31: The check valve assembly as recited in clause 30, wherein the first port fitting comprises a tubular stem having a first end and an opposing second end with the passage extending therebetween, an annular flange outwardly projecting from the second end of the tubular stem, the annular flange being secured to the base and having a maximum outer diameter that is greater than the maximum outer diameter of the retention plate.

Clause 32: The check valve assembly as recited in any one of clauses 29-31, wherein the retention plate comprises a plate body having a first side and an opposing second side, one or more flow paths pass through the plate body between the opposing sides through which fluid can pass.

Clause 33: The check valve assembly as recited in clause 32, wherein the one or more flow paths comprise a plurality of spaced apart flow paths.

Clause 34: The check valve assembly as recited in clauses 32 or 33, wherein the plate body of the retention plate extends to a perimeter edge, the one of more flow paths comprising one or more holes that pass through and are encircled by the plate body and/or one or more notches recessed into the perimeter edge of the plate body.

Clause 35: The check valve assembly as recited in clause 29, wherein the retention plate comprises a plate body having a first side and an opposing second side, the first side of the plate body sitting against the outer surface of the sealing disk, the retention plate further comprising a plurality of legs projecting from second side of the plate body so that the plurality of legs space the second side of the plate body away from the first port fitting.

Clause 36: The check valve assembly as recited in clause 35, wherein the plurality of legs comprise at least 2, 3, 4, or 5 legs.

Clause 37: The check valve assembly as recited in clauses 35 or 36, wherein the first port fitting comprises a tubular stem having a first end and an opposing second end with the passage extending therebetween, an annular flange outwardly projecting from the second end of the tubular stem, the annular flange being secured to the base.

Clause 38: The check valve assembly as recited in clause 37, wherein each of the plurality of legs terminates at a free end that sits against or is disposed directly adjacent to an inside face of the annular flange of the first port fitting.

Clause 39: The check valve assembly as recited in clause 29, further comprising the umbrella valve having a blind hole extending from the outer surface of the sealing disk and into the mounting stem.

Clause 40: The check valve assembly as recited in clause 39, wherein the retention plate comprises a plate body having a first side facing the umbrella valve and an opposing second side, an alignment stem extending from first side of the plate body and into the blind hole of the umbrella valve.

41: The check valve assembly as recited in clauses 29 or 39, wherein the retention plate comprises a plate body having a first side facing the umbrella valve and an opposing second side, the first side of the retention plate being free of any projections outwardly extending therefrom.

Clause 42: The check valve assembly as recited in any one of clauses 29-41, wherein the retention plate is more rigid than the umbrella valve.

Clause 43: The check valve assembly as recited in any one of clauses 29-42, wherein the passage of the first port fitting has a first maximum diameter and the passage of the second port fitting has a second maximum diameter, the first maximum diameter being larger than the second maximum diameter.

Clause 44: The check valve assembly as recited in any one of clauses 29-42, wherein the passage of the first port fitting has a first maximum diameter and the passage of the second port fitting has a second maximum diameter, the first maximum diameter being equal to the second maximum diameter.

Clause 45: The check valve assembly as recited in clause 29, further comprising:

the first port fitting comprising a stem having a first end and an opposing second end, an annular first flange outwardly projecting from the second end, the annular first flange being secured to the base and having a maximum first outer diameter; and the second port fitting comprising a stem having a first end and an opposing second end, an annular second flange outwardly projecting from the second end, the annular second flange being secured to the base and having a maximum second outer diameter.

Clause 46: The check valve assembly as recited in clause 45, wherein the maximum first outer diameter of the first flange is equal to the maximum second outer diameter of the second flange.

Clause 47: The check valve assembly as recited in any one of clauses 29-46, wherein the first port fitting is secured to the base by an adhesive or welding.

Clause 48: The check valve assembly as recited in any one of clauses 29-47, wherein the base comprises an annular sleeve encircling the seat, the first port fitting and the second port fitting each being secured to the annular sleeve.

Clause 49: The check valve assembly as recited in any one of clauses 29-48, wherein the mounting stem of the umbrella valve has a free end with an enlarged head formed thereat, the enlarged head being disposed on a side of the seat that is opposite the sealing disk.

Clause 50: A check valve assembly comprising:
a first port fitting having a passage extending therethrough;
a second port fitting having a passage extending therethrough;

a base having a seat with a central mounting hole passing therethrough and one or more flow channels passing therethrough, the base being disposed between the first port fitting and the second port fitting so that fluid flowing from the second port fitting to the first port fitting must pass through the one or more flow channels of the seat;

an umbrella valve comprising a flexible sealing disk having an outer surface and an opposing inner surface, a mounting stem extending from the inner surface of the sealing disk and projecting into the mounting hole of the base, the sealing disk being movable between a first position wherein at least a portion of the sealing disk sits on the seat of the base so as to cover the one or more flow channels and a second position wherein the sealing disk is resiliently flexed so as to at least partially uncover the one or more flow channels; and a retention plate comprising a plate body having a first side and an opposing second side, the retention plate being disposed between first port fitting and the seat so that the first side of the plate body sits against or adjacent to the outer surface of the sealing disk, the retention plate further comprising a plurality of legs projecting from second side of the plate body so that the plurality of legs space the second side of the plate body away from the first port fitting.

Clause 51: The check valve assembly as recited in clause 50, wherein the retention plate terminates at an outer perimeter edge, a gap being formed between the outer perimeter edge of the retention plate and the first port fitting so that fluid flowing from the second port fitting to the first port fitting can pass through the gap.

Clause 52: The check valve assembly as recited in clause 51, wherein the passage of the second port fitting has a maximum inner diameter and the outer perimeter edge of the retention plate has a maximum outer diameter, the maximum outer diameter of the retention plate being greater than the maximum inner diameter of the passage of the second port fitting.

Clause 53: The check valve assembly as recited in clause 52, wherein the first port fitting comprises a tubular stem having a first end and an opposing second end with the passage extending therebetween, an annular flange outwardly projecting from the second end of the tubular stem, the annular flange being secured to the base and having a maximum outer diameter that is greater than the maximum outer diameter of the retention plate.

Clause 54: The check valve assembly as recited in any one of clauses 50-53, wherein the retention plate comprises a plate body having a first side and an opposing second side, one or more flow paths pass through the plate body between the opposing sides through which fluid can pass.

Clause 55: The check valve assembly as recited in clause 54, wherein the one or more flow paths comprise a plurality of spaced apart flow paths.

Clause 56: The check valve assembly as recited in clause 54, wherein the plate body of the retention plate extends to a perimeter edge, the one of more flow paths comprising one or more holes that pass through and are encircled by the plate body and/or one or more notches recessed into the perimeter edge of the plate body.

Clause 57: The check valve assembly as recited in any one of clauses 50-56, wherein the first port fitting has a tubular stem with a first end and an opposing second end with an annular flange outwardly projecting therefrom, the annular flange being secured to the base.

Clause 58: The check valve assembly as recited in clause 57, wherein each of the plurality of legs terminate at a free end that sits against or is disposed directly adjacent to an inside face of the annular flange of the first port fitting.

Clause 59: The check valve assembly as recited in any one of clauses 50-58, further comprising the umbrella valve having a blind hole extending from the outer surface of the sealing disk and into the mounting stem.

Clause 60: The check valve assembly as recited in clause 59, wherein the retention plate comprises a plate body having a first side facing the umbrella valve and an opposing second side, an alignment stem extending from first side of the plate body and into the blind hole of the umbrella valve.

Clause 61: The check valve assembly as recited in clause 50, wherein the retention plate comprises a plate body having a first side facing the umbrella valve and an opposing second side, the first side of the retention plate being free of any projections outwardly extending therefrom.

Clause 62: The check valve assembly as recited in any one of clauses 50-61, wherein the retention plate is more rigid than the umbrella valve.

Clause 63: The check valve assembly as recited in any one of clauses 50-62, wherein the passage of the stem of the first port fitting has a first maximum diameter and the passage of the second port fitting has a second maximum diameter, the first maximum diameter being larger than the second maximum diameter.

Clause 64: The check valve assembly as recited in any one of clauses 50-63, wherein the base comprises an annular sleeve, the seat being secured to and disposed within the sleeve.

Clause 65: The check valve assembly as recited in clause 64, further comprising:

the first port fitting having a tubular sleeve with a first end with an annular hose barb disposed thereat and an opposing second end with an annular first flange outwardly projecting therefrom, the annular first flange being secured to the annular sleeve of the base and having a maximum first outer diameter; and the second port fitting having a tubular sleeve with a first end with an annular hose barb disposed thereat and an opposing second end with an annular second flange outwardly projecting therefrom, the annular second flange being secured to the annular sleeve of the base and having a maximum second outer diameter.

Clause 66: The check valve assembly as recited in clause 65, wherein the maximum first outer diameter of the first flange is equal to the maximum second outer diameter of the second flange.

Clause 67: A check valve assembly comprising:

a first port fitting having a passage extending therethrough;

a second port fitting having a passage extending therethrough;

a base having a seat with a central mounting hole passing therethrough and one or more flow channels passing therethrough, the base being disposed between the first port fitting and the second port fitting so that fluid flowing from the second port fitting to the first port fitting must pass through the one or more flow channels of the seat;

an umbrella valve comprising a flexible sealing disk having an outer surface and an opposing inner surface, a mounting stem extending from the inner surface of the sealing disk and projecting into the mounting hole of the base, the umbrella valve having a blind hole extending from the outer surface of the sealing disk and into the mounting stem, the sealing disk being movable between a first position wherein at least a portion of the sealing disk sits on the seat of the base so as to cover the one or more flow channels and a second position wherein the sealing disk is resiliently flexed so as to at least partially uncover the one or more flow channels; and a retention plate comprising a plate body having a first side and an opposing second side, an alignment stem extending from first side of the plate body and projecting into the blind hole of the umbrella valve.

Clause 68: The check valve assembly as recited in clause 67, wherein the retention plate terminates at an outer perimeter edge, a gap being formed between the outer perimeter edge of the retention plate and the first port fitting so that fluid flowing from the second port fitting to the first port fitting can pass through the gap.

Clause 69: The check valve assembly as recited in clause 68, wherein the passage of the first port fitting has a maximum inner diameter and the outer perimeter edge of the retention plate has a maximum outer diameter, the maximum outer diameter of the retention plate being greater than the maximum inner diameter of the passage of the first port fitting.

Clause 70: The check valve assembly as recited in clause 68, wherein the retention plate comprises a plate body having a first side and an opposing second side, one or more flow paths pass through the plate body between the opposing sides through which fluid can pass.

Clause 71: The check valve assembly as recited in clause 70, wherein the plate body of the retention plate extends to a perimeter edge, the one of more flow paths comprising one or more holes the pass through and are encircled by the plate body and/or one or more notches recessed into the perimeter edge of the plate body.

Clause 72: The check valve assembly as recited in clause 70, wherein the retention plate comprises a plate body having a first side and an opposing second side, the first side of the plate body sitting against the outer surface of the sealing disk, the retention plate further comprising a plurality of legs projecting from second side of the plate body so that the plurality of legs space the second side of the plate body away from the first port fitting.

Clause 73: The check valve assembly as recited in claim 67, wherein the passage of the stem of the first port fitting has a first maximum diameter and the passage of the second port fitting has a second maximum diameter, the first maximum diameter being larger than the second maximum diameter.

Each of the above independent aspects of the disclosure may include any of the features, options and possibilities set out in this document, including those under the other independent aspects, and may also include any combination of any of the features, options and possibilities set out in this document.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

Figure 1:
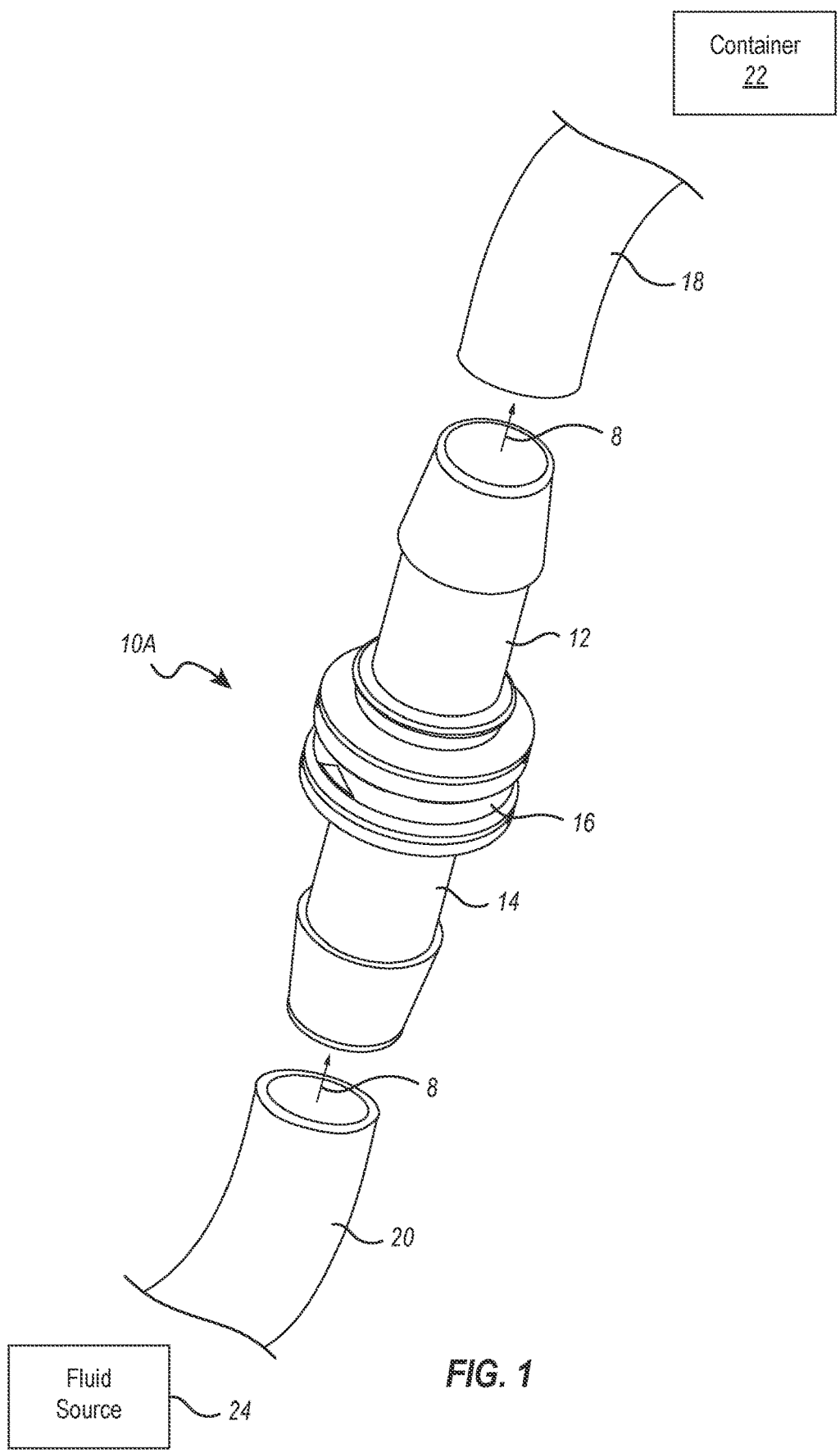
FIG. 1 is a perspective view of an inventive check valve assembly for coupling with fluid lines.

Before describing the present disclosure in detail, it is to be understood that this disclosure is not limited to parameters of the particularly exemplified systems, methods, apparatus, products, processes, compositions, and/or kits, which may, of course, vary. It is also to be understood that the terminology used herein is only for the purpose of describing particular embodiments of the present disclosure, and is not necessarily intended to limit the scope of the disclosure in any particular manner. Thus, while the present disclosure will be described in detail with reference to specific embodiments, features, aspects, configurations, etc., the descriptions are illustrative and are not to be construed as limiting the scope of the claimed invention. Various modifications can be made to the illustrated embodiments, features, aspects, configurations, etc. without departing from the spirit and scope of the invention as defined by the claims. Thus, while various aspects and embodiments have been disclosed herein, other aspects and embodiments are contemplated.

Unless defined otherwise, all technical and scientific terms used herein have the same meaning as commonly understood by one of ordinary skill in the art to which the present disclosure pertains. While a number of methods and materials similar or equivalent to those described herein can be used in the practice of the present disclosure, only certain exemplary materials and methods are described herein.

Various aspects of the present disclosure, including devices, systems, methods, etc., may be illustrated with reference to one or more exemplary embodiments or implementations. As used herein, the terms "alternative embodiment" and/or "exemplary implementation" means "serving as an example, instance, or illustration," and should not necessarily be construed as preferred or advantageous over other embodiments or implementations disclosed herein. In addition, reference to one or more embodiments is intended to provide illustrative examples without limiting the scope of the invention, which is indicated by the appended claims rather than by the following description.

It will be noted that, as used in this specification and the appended claims, the singular forms "a," "an" and "the"

include plural referents unless the content clearly dictates otherwise. Thus, for example, reference to an "insert" includes one, two, or more inserts. As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," and "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

Various aspects of the present disclosure can be illustrated by describing components that are coupled, attached, connected, and/or joined together. As used herein, the terms "coupled", "attached", "connected," and/or "joined" are used to indicate either a direct connection between two components or, where appropriate, an indirect connection to one another through intervening or intermediate components. In contrast, when a component is referred to as being "directly coupled", "directly attached", "directly connected," and/or "directly joined" to another component, no intervening elements are present or contemplated. Thus, as used herein, the terms "connection," "connected," and the like do not necessarily imply direct contact between the two or more elements. In addition, components that are coupled, attached, connected, and/or joined together are not necessarily (reversibly or permanently) secured to one another.

As used herein, directional and/or arbitrary terms, such as "top," "bottom," "front," "back," "left," "right," "up," "down," "upper," "lower," "inner," "outer," "internal," "external," "interior," "exterior," "proximal," "distal" and the like can be used solely to indicate relative directions and/or orientations and may not otherwise be intended to limit the scope of the disclosure, including the specification, invention, and/or claims.

Where possible, like numbering of elements have been used in various figures. In addition, similar elements and/or elements having similar functions may be designated by similar numbering (e.g., element "10" and element "210.") Furthermore, alternative configurations of a particular element may each include separate letters appended to the element number. Accordingly, an appended letter can be used to designate an alternative design, structure, function, implementation, and/or embodiment of an element or feature without an appended letter. Similarly, multiple instances of an element and or sub-elements of a parent element may each include separate letters appended to the element number. In each case, the element label may be used without an appended letter to generally refer to instances of the element or any one of the alternative elements. Element labels including an appended letter can be used to refer to a specific instance of the element or to distinguish or draw attention to multiple uses of the element. However, element labels including an appended letter are not meant to be limited to the specific and/or particular embodiment(s) in which they are illustrated. In other words, reference to a specific feature in relation to one embodiment should not be construed as being limited to applications only within said embodiment.

It will also be appreciated that where a range of values (e.g., less than, greater than, at least, and/or up to a certain value, and/or between two recited values) is disclosed or recited, any specific value or range of values falling within the disclosed range of values is likewise disclosed and contemplated herein. Thus, disclosure of an illustrative measurement or distance less than or equal to about 10 units or between 0 and 10 units includes, illustratively, a specific disclosure of: (i) a measurement of 9 units, 5 units, 1 units, or any other value between 0 and 10 units, including 0 units and/or 10 units; and/or (ii) a measurement between 9 units and 1 units, between 8 units and 2 units, between 6 units and 4 units, and/or any other range of values between 0 and 10 units.

It is also noted that systems, methods, apparatus, devices, products, processes, compositions, and/or kits, etc., according to certain embodiments of the present disclosure may include, incorporate, or otherwise comprise properties, features, aspects, steps, components, members, and/or elements described in other embodiments disclosed and/or described herein. Thus, reference to a specific feature, aspect, steps, component, member, element, etc. in relation to one embodiment should not be construed as being limited to applications only within said embodiment. In addition, reference to a specific benefit, advantage, problem, solution, method of use, etc. in relation to one embodiment should not be construed as being limited to applications only within said embodiment.

The headings used herein are for organizational purposes only and are not meant to be used to limit the scope of the description or the claims. To facilitate understanding, like reference numerals have been used, where possible, to designate like elements common to the figures.

The present disclosure is directed to check valve assemblies containing an umbrella valve that can be used to control the flow of a fluid through a line or device. Specifically, the check valve assemblies enable a fluid to freely flow in one direction of a line or device but are self-sealing so as to prevent the flow of fluid in the opposite direction. The inventive check valve assemblies can be used with a variety of different types of fluids, including a variety of different gases and liquids. The check valve assemblies can also be used in a variety of different applications, such as in the processing of pharmaceutical products, biopharmaceutical products, chemical products, food products and other solutions, suspensions or types of liquids.

Depicted in FIG. 1 is a perspective view of one embodiment of an inventive check valve assembly 10A incorporating features of the present disclosure. Check valve assembly 10A is configured so that a fluid, such as a gas or liquid, can flow in a direction along arrow 8 through check valve assembly 10A but is precluded from flowing in the opposite direction through check valve assembly 10A. In general, check valve assembly 10A includes a first port fitting 12, an opposing second port fitting 14, and a base 16 that is disposed therebetween. First port fitting 12 is configured to couple with a first fluid line 18 while second port fitting 14 is configured to couple with a second fluid line 20. Each of fluid lines 18 and 20 can comprise a flexible tube, such as conventional tubing, or can comprise a rigid tube.

In one embodiment, first fluid line 18 can extend to and couple with a container 22. Container 22 can comprise a rigid container or a flexible bag made of one or more sheets of polymeric film. In some embodiments, container can comprise a bioreactor and fermentor for growing cultures of cells or microorganisms. By way of example and not by limitation, first fluid line 18 may be coupled to a sparger for sparging a gas into a bioreactor or fermentor. In other embodiments, first fluid line 18 can be coupled to other types of containers for use in processing biological materials, pharmaceutical products, chemicals, food products, or other materials. Second fluid line 20 can couple to a fluid source 24, such as a gas source or liquid source, where the corresponding gas or liquid needs to be delivered into container 22.

Figure 2:
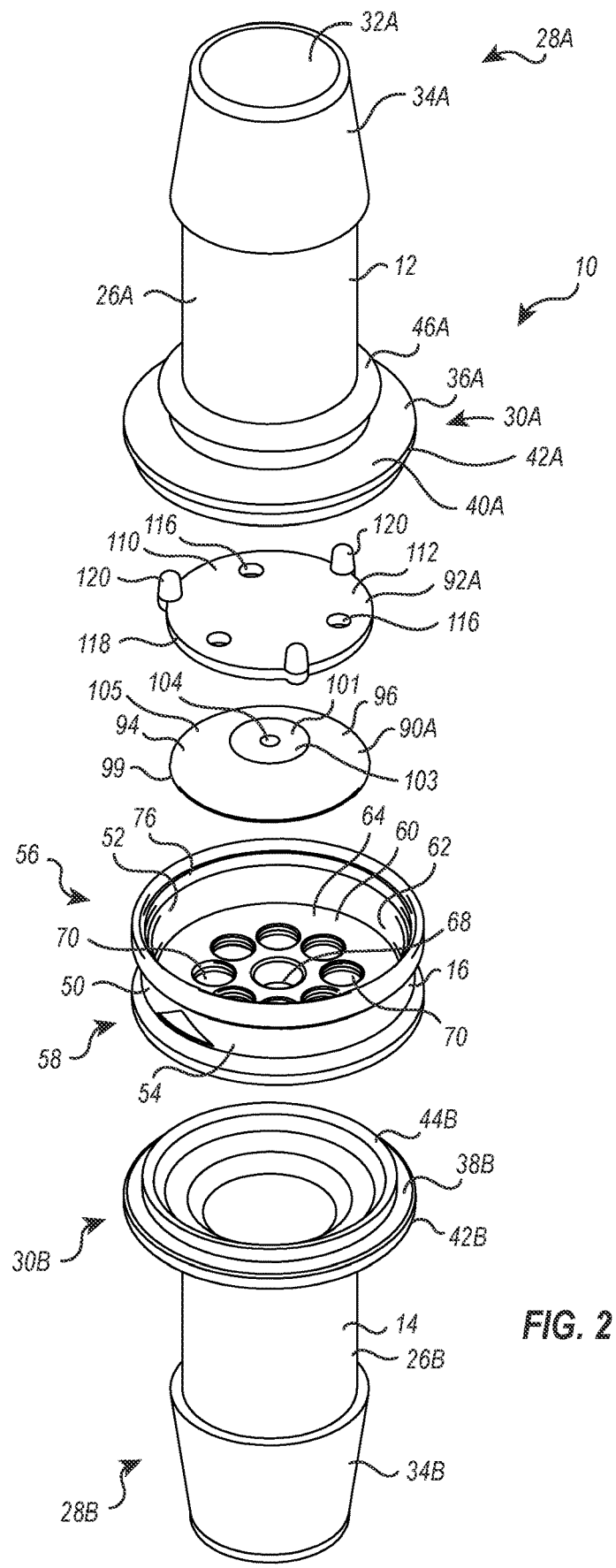
FIG. 2 is an exploded top perspective view of the check valve assembly shown in FIG. 1.
Figure 3:
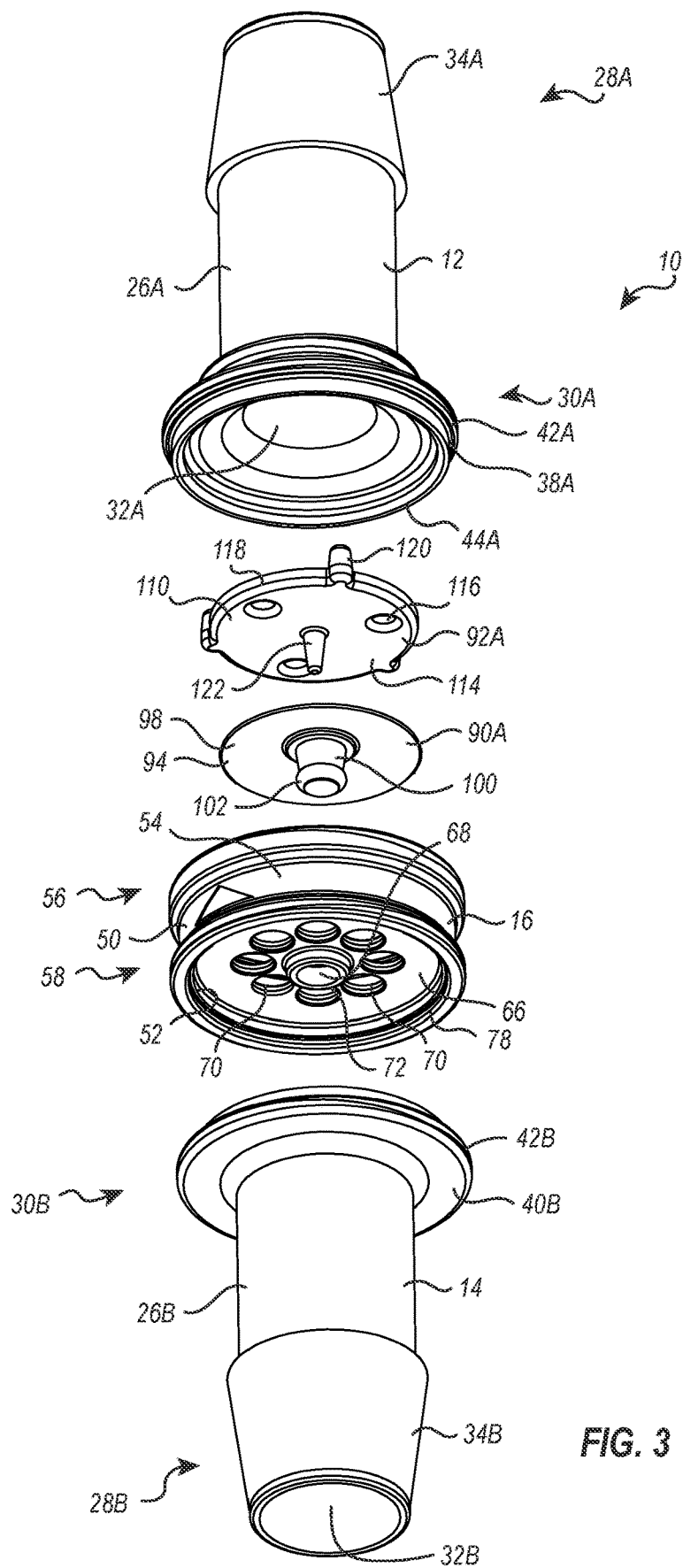
FIG. 3 is an exploded bottom perspective view of the check valve assembly shown in FIG. 1.

As depicted in FIGS. 2 and 3, first port fitting 12 comprises an elongated tubular stem 26A that extends between a first end 28A and an opposing second end 30A. Stem 26A bounds a passage 32A that longitudinally extends therethrough. In one embodiment, means are provided for fluid coupling first end 28A of stem 26A to a fluid line, such as first fluid line 18. By way of example, an annular hose barb 34A is disposed on first end 28A so as to encircle and outwardly project from stem 26A. Hose barb 34A is configured so that it can be pressed within first fluid line 18 so as to form a liquid tight seal between first port fitting 12 and first fluid line 18. Where needed, as discussed further below, a synch, such as a crimp, compression collar, or pull tie, can also be placed around fluid line 18 to help produce the liquid tight seal with first port fitting 12.

In other embodiments, two or more hose barbs can be disposed on stem 26. In still other embodiments, hose barb 34 can be replaced with annular ribs, rings or other structures formed on stem 26A that will form a liquid tight seal against the interior surface of first fluid line 18. In yet other embodiments of the means for fluid coupling, hose barb 34 can be eliminated and replaced with other conventional types of fluid couplers such as a union or aseptic connector.

Continuing with FIGS. 1 and 2, first port fitting 12 further includes an annular first mounting flange 36A encircling and radially outwardly projecting from second end 30A of stem 26A. First mounting flange 36A has an inside face 38A that faces towards base 16 and an opposing outside face 40A that each extend to an outer perimeter edge 42A. An annular ring 44A projects from inside face 38A toward base 16 so as to encircle passage 32A. As discussed below in greater detail, ring 44A is used to engage and help form a liquid tight seal with base 16.

As shown in FIG. 2, a stop flange 46A is shown encircling and radially outwardly projecting from stem 26A at a location between hose barb 34A and first mounting flange 36A. Stop flange 46A is used to stop the advancement of first fluid line 18 onto stem 26A during assembly and helps to identify that first fluid line 18 is properly positioned on first port fitting 12. Specifically, during assembly, first end 28A of first port fitting 12 is slid within first fluid line 18 until the terminal end of first fluid line 18 butts against stop flange 46A. In some embodiments, as mentioned above, a synch, such as a crimp, compression collar, or pull tie, can then be secured and compressed around first fluid line 18 at a location between stop flange 46A and hose barb 34A so as to both secure first fluid line 18 to first port fitting 12 and produce a liquid tight seal therebetween.

It is appreciated that stop flange 46A need not be annular but could comprise a plurality of spaced apart sections that outwardly project from stem 26A. In other embodiments, stop flange 46A can be eliminated. In this embodiment, indicia, such as a marking or groove, could be place on the exterior surface of stem 26A to indicate the proper positioning of the terminal end of first fluid line 18. Alternatively, first mounting flange 36A can be configured to function as the stop flange.

In the depicted embodiment, second port fitting 14 has substantially the same configuration as first port fitting 12. As such, all the above discussion with regard to first port fitting 12, including alternatives and uses, are also applicable to second port fitting 14. The exceptions are that second port fitting 14 is intended for coupling with second fluid line 20 and stop flange 46A is eliminated from second port fitting 14. Like elements between port fitting 12 and 14 are identified by like reference characters except that the reference characters used on second port fitting 14 include the suffix "B."

Continuing with the FIGS. 2 and 3, base 16 comprises an annular sleeve 50 having an interior surface 52 and an opposing exterior surface 54 that extend between a first end 56 and an opposing second end 58. Sleeve 50 encircles an opening 62. Base 16 also includes a seat 60 that is secured to interior surface 52 of sleeve 50 so as to extend over opening 62. Seat 60 has a first side 64 that faces towards first port fitting 12 and an opposing second side 66 that faces towards second port fitting 14. First side 64 and second side 66 are typically planar.

Centrally extending through seat 60 between opposing sides 64 and 66 is a mounting hole 68. A plurality of flow channels 70 also pass through seat 60 between opposing sides 64 and 66. Flow channels 70 are positioned at locations radially spaced from mounting hole 68 so as to be placed around mounting hole 68. Specifically, flow channels 70 are spaced apart and are typically located at a common radius from mounting hole 68. In other embodiments, however, it is not necessary that all of flow channels 70 be disposed at a common radius from mounting hole 68. Rather, as discussed below in more detail, flow channels 70 can be disposed at two or more different radius from mounting hole 68. In the depicted embodiment, eight flow channels 70 are formed. However, in other embodiments, it is appreciated that the number of flow channels 70 can comprise at least one, two, four, six, eight, ten, or in a range between any two of the foregoing numbers.

Outwardly projecting from second side 66 of seat 60 so as to encircle mounting hole 68 is a stem 72. As better shown in FIG. 5 and discussed below in more detail, mounting hole 68 inwardly constricts as it passes from seat 60 through stem 72. In alternative embodiments, stem 72 can be eliminated by increasing the thickness of seat 60.

Figure 4:
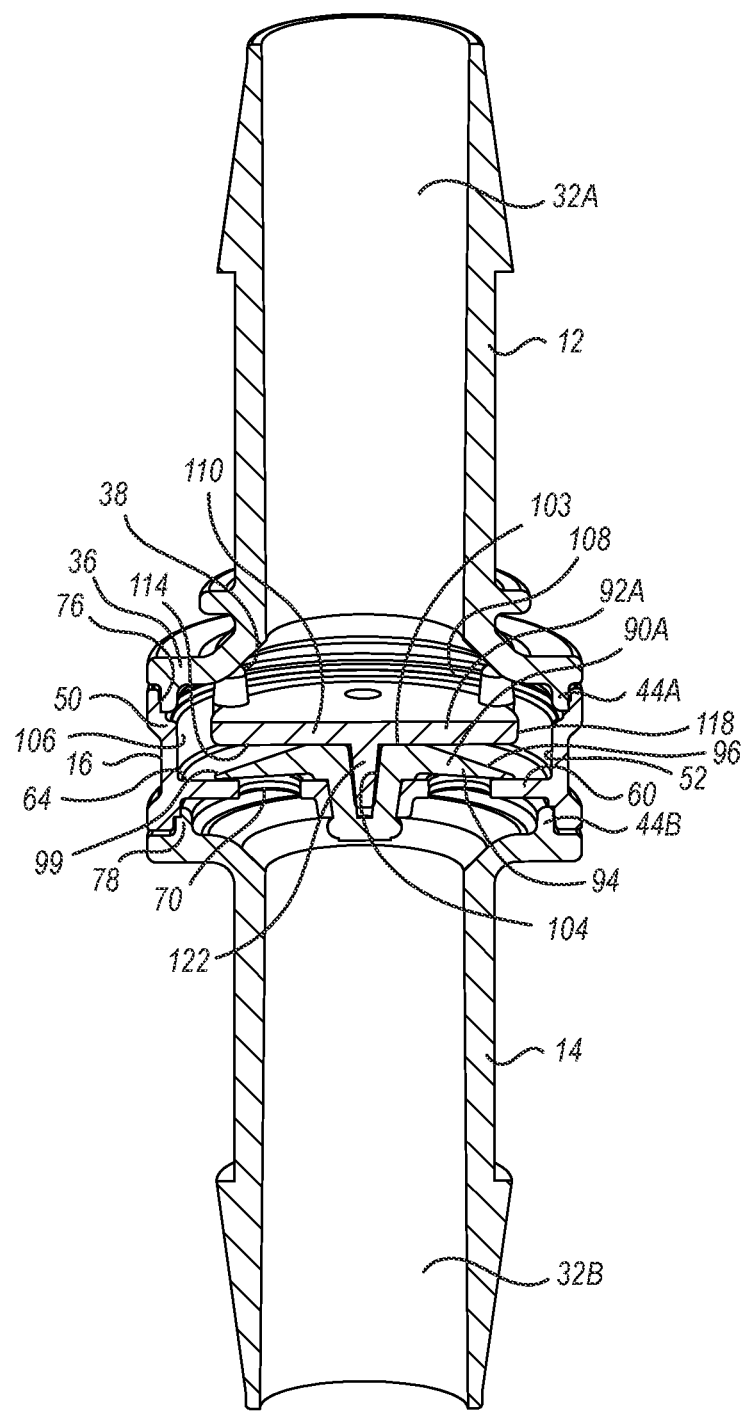
FIG. 4 is an elevated cross-sectional side view of the check valve assembly shown in FIG. 1 with the umbrella valve in a closed first position.

Returning to FIGS. 2 and 3, an annular groove 76 is formed on interior surface 52 of sleeve 50 at first end 56 and is configured to receive ring 44A of first port fitting 12. Likewise, an annular groove 78 is formed on interior surface 52 of sleeve 50 at second end 58 and is configured to receive ring 44B of second port fitting 14. During assembly, as shown in FIG. 4, ring 44A is received within groove 76 while ring 44B is received within groove 78A. The structures are then further secured together, such as by adhesive or welding, so as to form a liquid tight seal therebetween. In this assembly, fluid can now flow from second port fitting 14, through flow channels 70 and out first port fitting 12.

With continued reference to FIGS. 2 and 3, check valve assembly 10A also includes an umbrella valve 90A and a retention plate 92A. Umbrella valve 90A generally comprises a flexible sealing disk 94 having a mounting stem 100 projecting therefrom. More specifically, sealing disk 94 typically has a circular configuration with an outer surface 96 and an opposing inner surface 98 that each extend to a perimeter edge 99. Mounting stem 100 centrally projects from inner surface 98. Umbrella valve 90A is typically formed as a single, unitary structure and is comprised of a resiliently flexible material such as silicone. Other flexible materials can also be used. The remaining components of check valve assembly 10A, i.e., port fittings 12 and 14, base 16 and retention plate 92A are typically made of a material that is more rigid than the material that is used to make umbrella valve 90A. These other components 12, 14, 16 and 92A are typically made of a plastic such as polycarbonate. Other materials can also be used. The materials are typically chosen for compatibility with planned use, such as stability at intended temperatures, stability when exposed to fluids, ability to be sterilized by radiation, etc.

Sealing disk 94 has domed shaped configuration. That is, outer surface 96 has a central apex 101 and both outer surface 96 and inner surface 98 slope down, i.e., toward seat 60, and radially away from apex 101 to perimeter edge 99. The term "domed shaped," as used in the specification and append claims broad includes both 3-dimension curved, sloping surfaces, such as concave and convex surface, and 3-dimensional linear, sloping surfaces such as conical and frustoconical surfaces. Thus, outer surface 96 or a portion thereof can have a conical, frustoconical, 3-dimensional convex curvature, or have other domed configurations. Likewise, inner surface 98 or a portion thereof can have a conical, frustoconical, 3-dimensional concave curvature, or have other domed configurations. In the specific embodiment shown in FIG. 2, outer surface 96 includes a flat platform surface 103 located at apex 101 domed sealing surface 105 that extends from platform surface 103 to perimeter edge 99. Although not always required, in the depicted embodiment, a blind hole 104 centrally passes through outer surface 96 of sealing disk 94, e.g., at apex 101, and into mounting stem 100. Blind hole 104 is better shown in FIG. 4. Sealing disk 94 also typically tapers, i.e., gets thinner, as it extends to perimeter edge 99.

Figure 5:
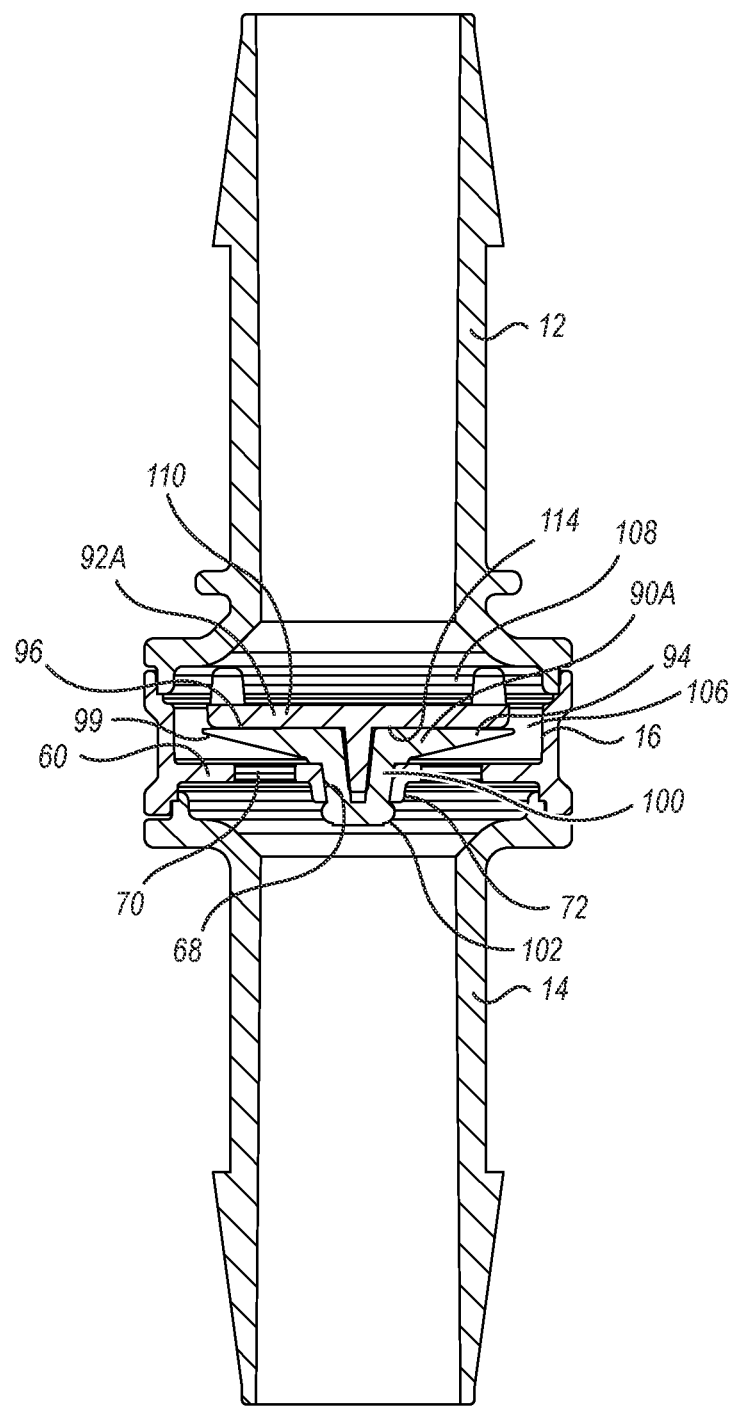
FIG. 5 is an elevated cross-sectional side view of the check valve assembly shown in FIG. 4 with the umbrella valve in an open second position.

Disposed at a free end of mounting stem 100 is an enlarged head 102. Enlarged head 102 has an outer diameter that is larger than the minimum inner diameter of mounting hole 68 of seat 60. During assembly, as shown in FIG. 5, head 102 is compressed as it is pushed through mounting hole 68. Once enlarged head 102 passes through mounting hole 68, enlarged head 102 resiliently expands so as to again be larger than the diameter of mounting hole 68, thereby securing umbrella valve 90A to seat 60 of base 16. The constriction of mounting hole 68, as previously discussed, helps to facilitate pressing enlarged head 102 through mounting hole 68 and also helps to secure umbrella valve 90A to seat 60. However, in other embodiments, mounting hole 68 need not be tapered.

Umbrella valve 90A is configured so that in the assembled state, as shown in FIG. 4, umbrella valve 90A can be in a relaxed first position wherein at least outer perimeter edge 99 of sealing disk 94 directly sits and resiliently presses against first side 64 of seat 60 so as to form a liquid tight seal therebetween. Umbrella valve 90A is also configured so that in the first position, sealing disk 94 covers all of flow channels 70. During operation, a fluid travels through second port fitting 14 and through flow channels 70 of seat 60 toward umbrella valve 90A. Pressure produced by the traveling fluid causes umbrella valve 90A to move from the first position, shown in FIG. 4, to a second position, as shown in FIG. 5. That is, the fluid pressure causes at least perimeter edge 99 of sealing disk 94 to upwardly flex, i.e., flex away from flow channels 70 and seat 60, so that the fluid can flow through flow channels 70, around perimeter edge 99 of sealing disk 94 and out through first port fitting 14. However, as the fluid flow stops, sealing disk 94 of umbrella valve 90A resiliently rebounds back to the first position (FIG. 4) so as to again cover flow channels 70 and seal against seat 60. Umbrella valve 90A thus seals flow channels 70 closed so that the fluid cannot flow in the opposite direction back through seat 60.

Returning to FIGS. 2 and 3, retention plate 92A comprises a plate body 110 having a first side 112 and an opposing second side 114. In the depicted embodiment, both first side 112 and second side 114 are planar. However, in alternative embodiments, first side 112 and/or second side 114 can have a concave, convex or other non-planar configuration. A plurality of flow paths 116 pass through plate body 110 between opposing sides 112 and 114. In the depicted embodiment, three flow paths 116 are shown. However, in other embodiments, flow paths 116 can be limited to a single flow path or can comprise at least one, two, three, four, six, or eight flow paths or be in a range between any two of the foregoing numbers. Plate body 110 extends to a perimeter edge 118. A plurality of legs 120 project from first side 112 of plate body 110 way from second side 114, i.e., towards first port fitting 12. In the embodiment depicted, legs 120 are disposed at perimeter edge 118. However, in other embodiments, legs 120 can be disposed inward of perimeter edge 118. Centrally projecting from second side 114 of plate body 110 is an alignment stem 122. Alignment stem 122 is configured to be received within blind hole 104 of umbrella valve 90A. In the depicted embodiment, alignment stem 122 and blind hole 104 have complementary tapers to help facilitate alignment and insertion of alignment stem 122 into blind hole 104. However, in other embodiments, alignment stem 122 and blind hole 104 need not be tapered.

During assembly, once umbrella valve 90A is secured to seat 60 of base 16, as discussed above, alignment stem 122 of retention plate 92 is received within blind hole 104 of umbrella valve 90A so that second side 114 of plate body 110 rest directly against outer surface 96 of sealing disk 94 of retention valve 90A, as shown in FIG. 4. More specifically, second side 114 of plate body 110 rest directly against flat platform surface 103 of outer surface 96 of sealing disk 94. First port fitting 12 and second port fitting 14 are then secured to sleeve 50 of base 16, as previously discussed. The order of the assembly of the parts can be altered as will be apparent to those skilled in the art. Retention plate 92A is configured so that legs 120 either directly contact or are adjacently disposed to inside face 38 of first mounting flange 36 of first port fitting 12. To help facilitate this alignment, plate body 110 is typically formed having a maximum diameter that is larger than a maximum diameter of passage 32A extending through stem 26A of first port fitting 12. However, plate body 110 also has a maximum diameter that is typically smaller than the inner diameter of sleeve 50 of base 16. As a result, a gap 106 is formed between perimeter edge 118 of plate body 110 and interior surface 52 of sleeve 50 through which fluid can flow. Likewise, as a result of legs 120, a gap 108 is also formed between plate body 110 and first port fitting 12 through which fluid can flow. Legs 120 thus restrict movement of retention plate 92A, i.e., plate body 110, away from umbrella valve 90A and also provide a gap for fluid flow.

During operation, fluid flows through second port fitting 14 and through flow channels 70 so as to flex umbrella valve 90A to the second position, as shown in FIG. 5 and previously discussed. Because retention plate 92 only sits against platform surface 103 of sealing disk 94 and does not interact with perimeter edge 99 (when in the first position shown in FIG. 4), retention plate 92 does not interfere with umbrella valve 90A moving between the first and second positions. The fluid then flows around plate body 110 by passing through gaps 106 and 108 and out through first port fitting 12. Again, when the fluid flow stops, umbrella valve 90A resiliently returns back to its first position so as to seal flow channels 70 closed. With reference to FIG. 5, when umbrella valve 90A is flexed into the second position, all or a majority of outer surface 96 of sealing disk 94 can press against second side 114 of retention plate 92A. Flow paths 116 (FIGS. 2 and 3) are formed extending through sealing disk 94 so as to help prevent the formation of a vacuum between sealing disk 94 and plate body 110 of retention plate 92A when umbrella valve 90A is flexed into the second position. A vacuum formed between sealing disk 94 and plate body 110 could result in umbrella valve 90A remaining in the second position even when fluid flow is stopped, thereby enabling fluid to freely flow in both directions through check valve assembly 10A. Flow paths 116 are formed so that one end is covered by sealing disk 94 when umbrella valve 90A is in the second position. However, because the opposing end of flow paths 116 remain open, fluid can freely flow through flow paths 116 and between sealing disk 94 and plate body 110 so as to prevent the formation of a vacuum therebetween.

Retention plate 92A functions to help retain umbrella valve 90A secured to seat 60 to ensure proper operation of check valve assembly 10A. Specifically, without retention plate 92A, under certain conditions, such as under high fluid flow rates or under sudden bursts of high fluid pressure, the fluid pressure can be sufficiently high to force mounting stem 100 of umbrella valve 90A out of mounting hole 68 so as to dislodge umbrella valve 90A from base 16, i.e., seat 60. Once umbrella valve 90A dislodges from base 16, umbrella valve 90A no longer functions as a one-way check valve. As a result, fluid can more freely flow in either direction between port fittings 12 and 14 which can result in contamination of the material being processed within container 22. In addition, the failure of check valve assembly 10A can potentially result in fluid leaking out of container 22. However, because retention plate 92 is continually held stable against or adjacent to umbrella valve 90A, retention plate 92 restricts movement of umbrella valve 90A that could result in dislodging of umbrella valve 90A from base 16, i.e., seat 60, even under elevated flow rates or burst of high fluid pressure. Thus, retention plate 92 ensures proper operation of check valve assembly 10A and thereby minimizes loss, contamination, or disruption of production of the fluid being processed within container 22.

Figure 6:
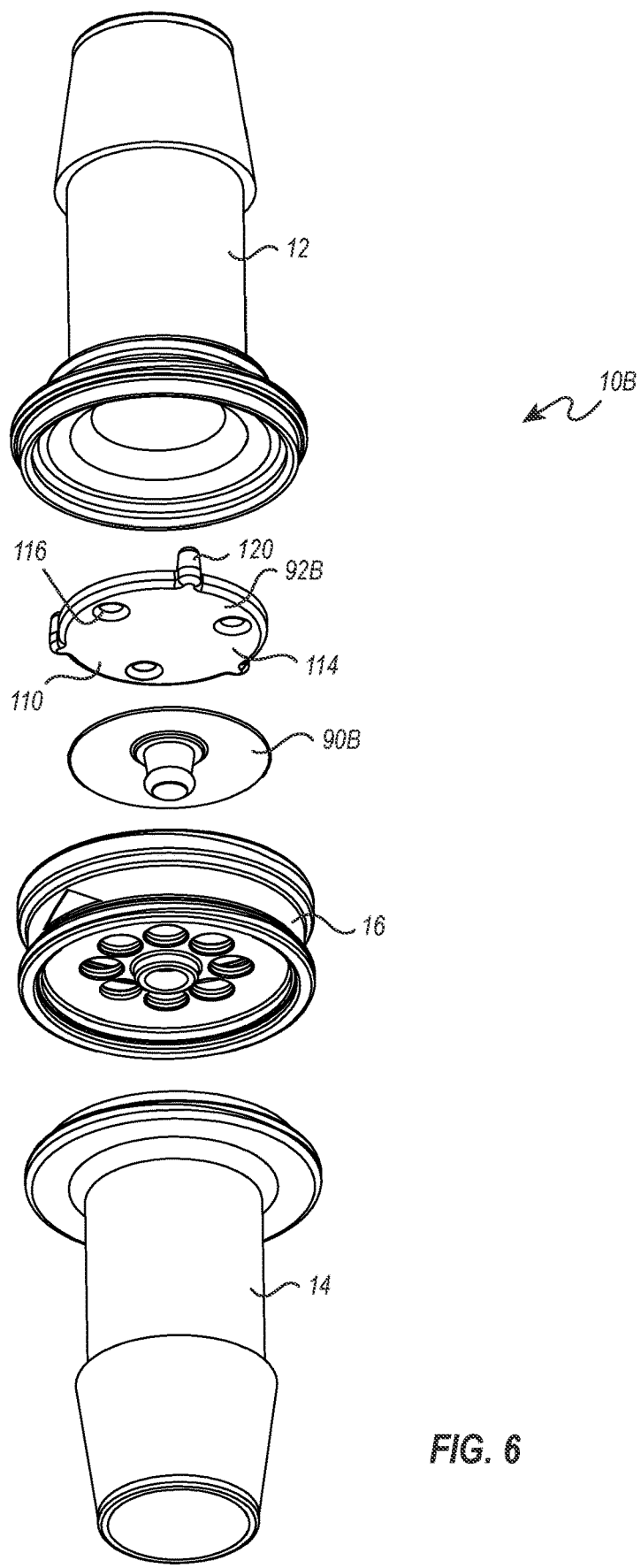
FIG. 6 is an exploded bottom perspective view of an alternative of the check valve assembly shown in FIG. 1 wherein a retention plate thereof has been modified to remove an alignment stem that projects therefrom.
Figure 7:
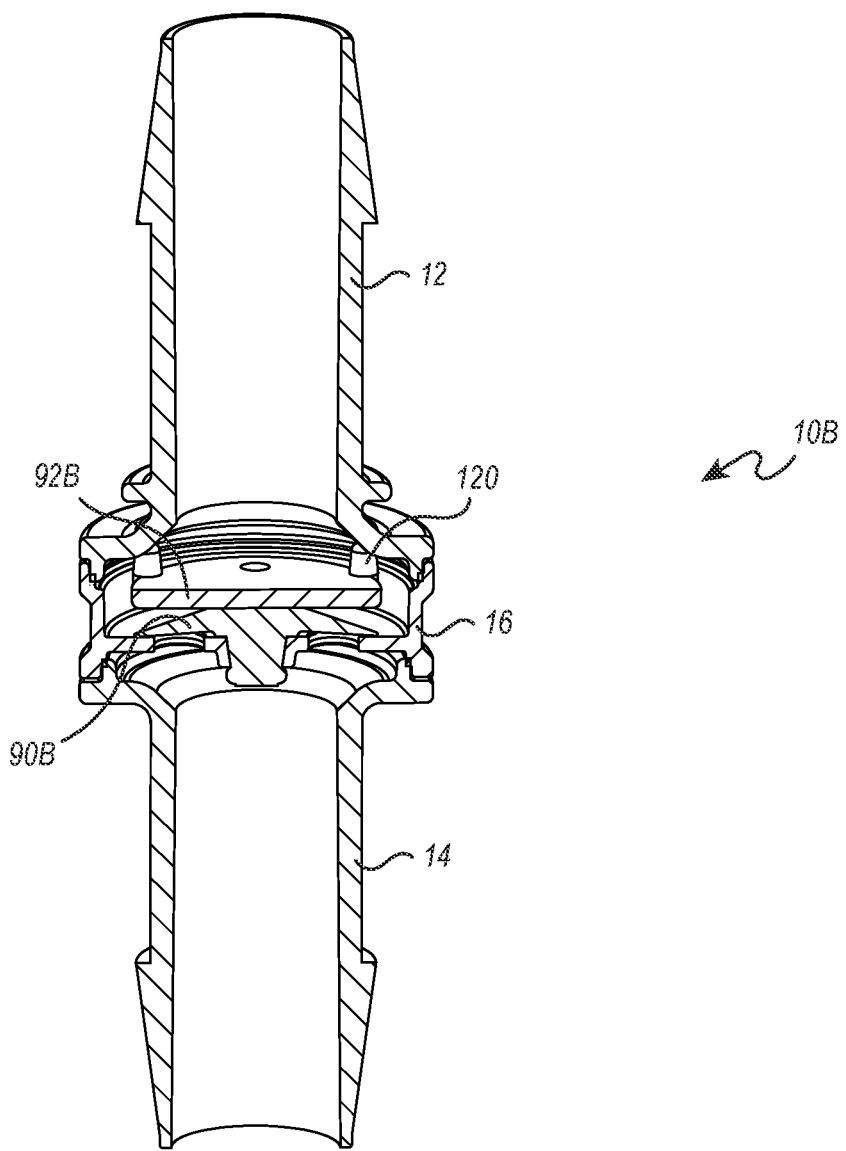
FIG. 7 is an elevated cross-sectional side view of the alternative check valve assembly shown in FIG. 6.

It is appreciated that check valve assembly 10A and the components thereof can have a variety of different configurations. For example, depicted in FIG. 6 is an alternative embodiment of a check valve assembly 10B wherein like elements between check valve assembly 10A and 10B are identified by like reference characters. Check valve assembly 10B is identical to check valve assembly 10A except that check valve assembly 10B includes a modified umbrella valve 90B and a modified retention plate 92B. Retention plate 92B is identical to retention plate 92A except that alignment stem 122 has been removed. As such, second side 114 of plate body 110 is shown as being planar with no projections outwardly extending therefrom. In turn, as depicted in FIG. 7, umbrella valve 90B is identical to umbrella valve 90A except that blind hole 104 has been removed.

Check valve assembly 10B still functions in the same way as check valve assembly 10A and all of the prior discussions, alternatives and methods as previously discussed with regard to check valve assembly 10A, except regarding the use of alignment stem 122, are also applicable to check valve assembly 10B. That is, although alignment stem 122 and blind hole 104 are helpful during the assembly of check valve assembly 10A and also help to ensure and maintain proper centering of retention plate 92A on umbrella valve 90A, the centering can also be achieved by sizing retention plate 92B so that legs 120 of retention plate 92B hit against first port fitting 12 so as to establish and maintain centering of retention plate 92B on umbrella valve 90B during operation. In still other embodiments, it is not necessarily that retention plate 92B be perfectly centered on top of umbrella valve 90B to still perform its intended function, as discussed above. It is also appreciated that retention plate 92B having alignment stem 122 removed therefrom, can be used with umbrella valve 90A that has blind hole 104 formed thereon. In that case, blind hole 104 would simply not receive any structure from retention plate 92B.

Figure 8:
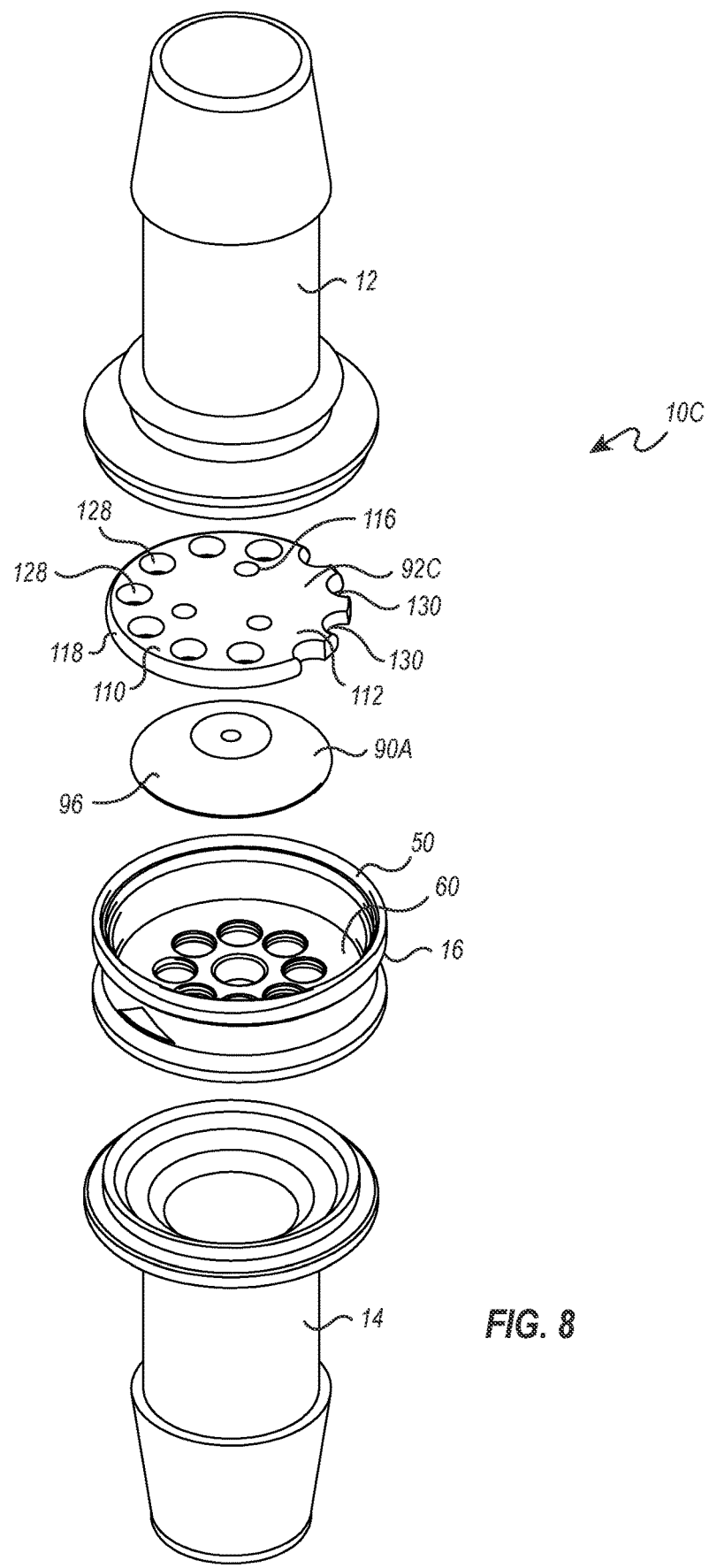
FIG. 8 is an exploded top perspective view of another alternative embodiment of the check valve assembly shown in FIG. 1 wherein the retention plate has been further modified.
Figure 9:
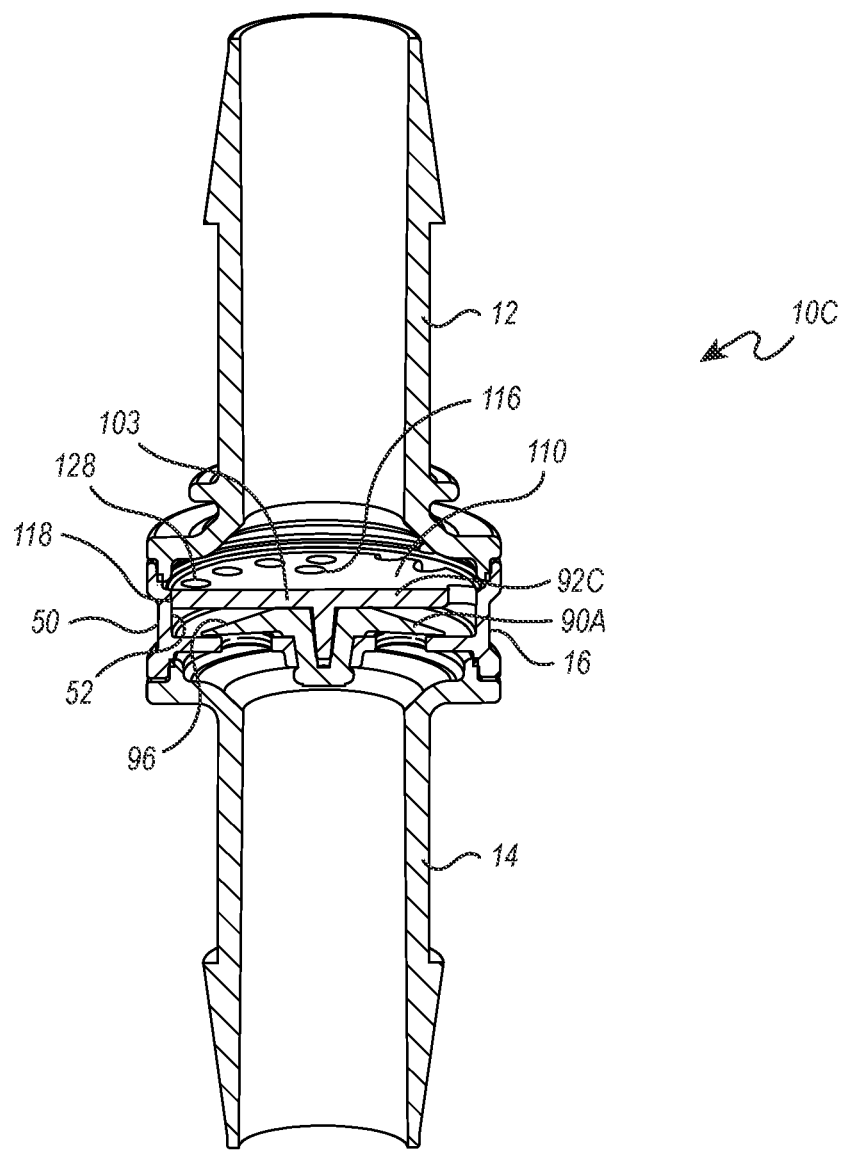
FIG. 9 is a cross-sectional side view of the alternative check valve assembly shown in FIG. 8.

Depicted in FIGS. 8 and 9 is another alternative embodiment of a check valve assembly 10C incorporating features of the present disclosure. Like elements between check valve assembly 10A and 10C are identified by like reference characters. Check valve assembly 10C is identical to check valve assembly 10A except that check valve assembly 10C includes a modified retention plate 92C. As previously discussed with regard to FIGS. 4 and 5, retention plate 92A was formed so that plate body 110 has an outer diameter that is smaller than the inner diameter of sleeve 50. As a result, gap 106 (FIG. 5) is formed between plate body 110 and sleeve 50 of base 16 through which fluid can flow. In contrast, with reference to FIGS. 8 and 9, plate body 110 of retention plate 92C has an outer diameter that is comparable to the inner diameter of sleeve 50. As a result, outer perimeter edge 118 of plate body 110 can engage directly against interior surface 52 of sleeve 50. However, plate body 110 of retention plate 92C has a plurality of flow paths 128 extending therethrough toward perimeter edge 118 which are not covered by umbrella valve 90A when umbrella valve 90A is in the second position. As such, fluid can flow through flow paths 128 when umbrella valve 90 is in the second position, thereby eliminating the need for gap 106.

In the embodiment shown in FIGS. 8 and 9, flow paths 128 are completely encircled by plate body 110. However, in alternative to or in conjunction with flow path 128, a plurality of flow paths 130 can also be formed that extend through plate body 110 but that intersect with perimeter edge 118. Flow paths 130 are thus formed as notches that extend into perimeter edge 118. Again, flow paths 130 are not covered by umbrella valve 90A when umbrella valve 90A is in the second position. As such, fluid can flow through flow paths 130 when umbrella valve 90A is in the second position, thereby eliminating the need for gap 106.

Retention plate 92C can be secured to sleeve 50 of base 16 such as by welding, adhesive, press fitting or being sandwiched between portions of first port fitting 12 and sleeve 50. Retention plate 92C is positioned and secured so as to rest against or be disposed directly adjacent to outer surface 96/platform surface 103 of umbrella valve 90A so as to again ensure no dislodgement of umbrella valve 90A from seat 60 of base 16, as discussed above. By securing retention plate 92C to base 16, legs 120 (FIG. 2) can be eliminated from retention plate 92C. Alternatively, retention plate 92C need not be secured to base 16. In this embodiment, legs 120 (FIG. 2) can be disposed so as to upstand from first side 112 of plate body 110 of retention plate 92C so as to rest against first port fitting 12, as previously discussed, thereby again ensuring no dislodgement of umbrella valve 90A from seat 60 of base 16. Retention plate 92C can be used with or without alignment stem 122 and blind hole 104.

Figure 10:
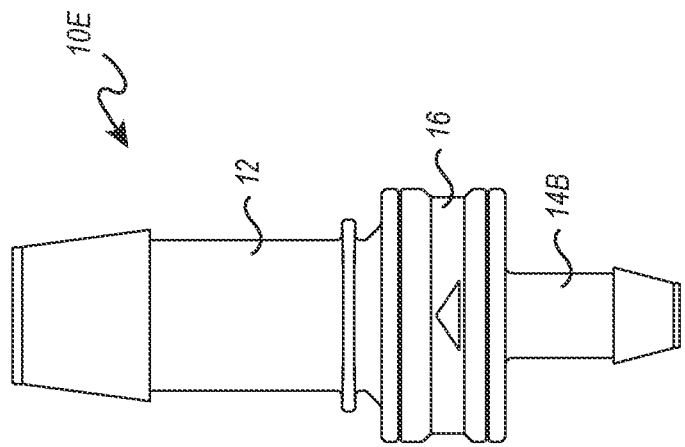
FIG. 10 is an elevated side view of three check valve assemblies having different sized port fittings.
Figure 10:
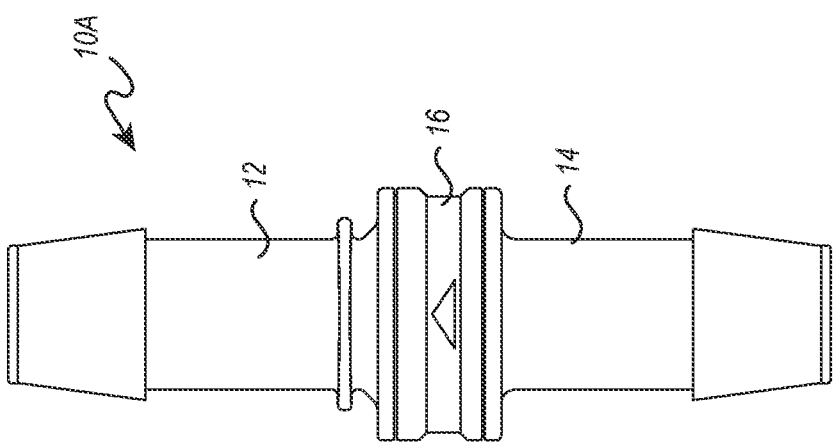
Figure 10:
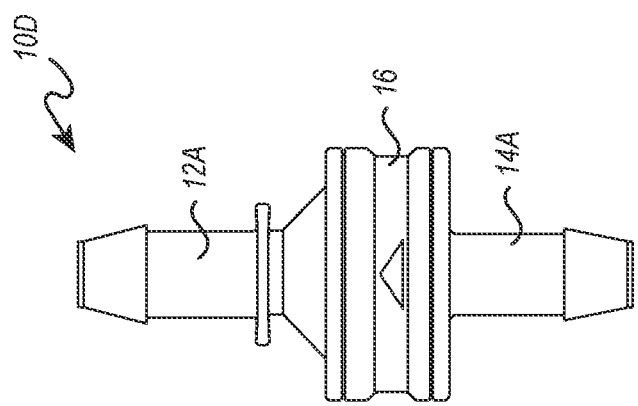
Figure 11:
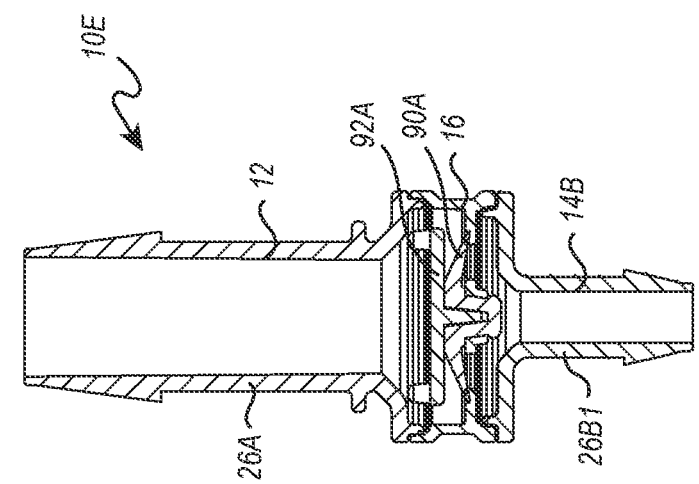
FIG. 11 is an elevated cross-sectional side view of the check valve assemblies shown in FIG. 10.
Figure 11:
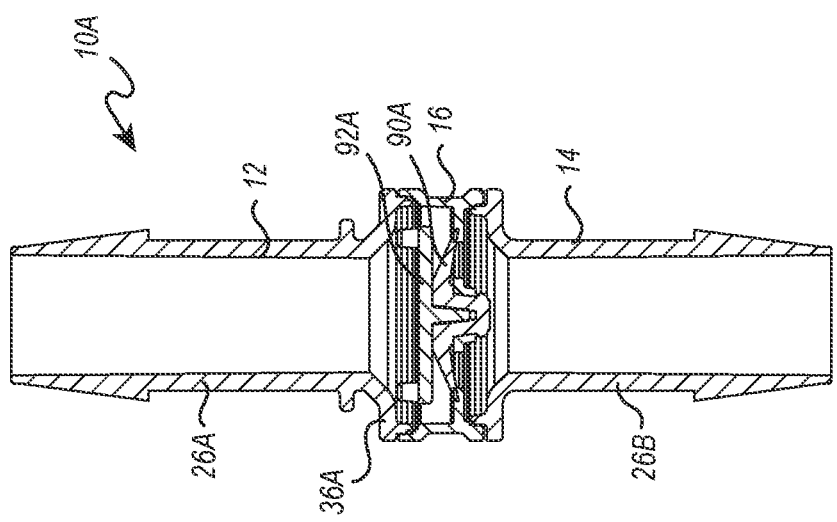
Figure 11:
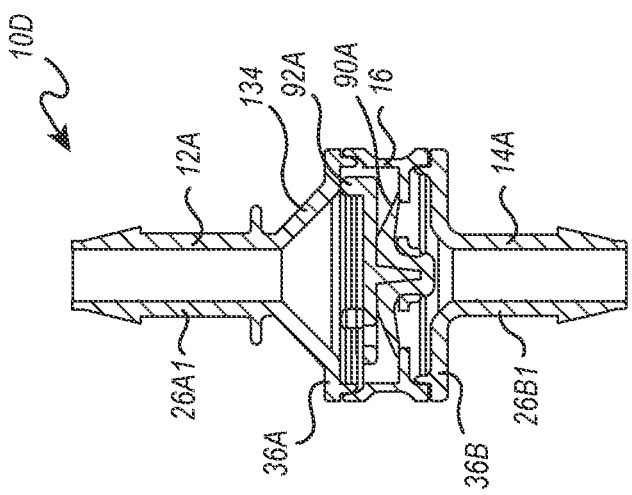

As depicted in FIGS. 10 and 11, check valve assemblies 10A, 10D and 10E are shown. Like elements between check valve assemblies 10A, 10D and 10E are identified by like reference characters. Check valve assemblies 10D and 10E are identical to check valve assembly 10A except that they are formed with different sized port fittings 12 and 14. That is, one of the unique benefits of the inventive check valve assemblies is that they have a modular configuration that enables easy assembly of different check valve assemblies having different port fitting configurations depending on the intended application. For example, check valve assembly 10D still includes base 16, umbrella valve 90A and retention plate 92A. However, in contrast to using port fitting 12 and 14, check valve assembly 10D includes port fitting 12A and 14A. Port fitting 12A includes the same mounting flange 36A as port fittings 12 for coupling with base 16, as previously discussed. However, port fitting 12A includes a stem 26A1 having a smaller inner diameter and outer diameter than stem 26A. As such, stem 26A1 can be used for coupling check valve assembly 10C to a smaller diameter first fluid line 18. To accommodate the use of stem 26A1, a constricting junction 134 extends between mounting flange 36A and stem 26A1.

Port fitting 14A is similar to port fitting 14 in that it includes mounting flange 36B for coupling with base 16. However, port fitting 14A also includes a stem 26B1 having an inner diameter and outer diameter smaller than stem 26B. Again, the use of stem 26B1 enables check valve assembly 10C to be fluid coupled to a smaller diameter second fluid line 18. It is appreciated that stems 26A1 and 26B1 can be formed having any desired diameter. Thus, check valve assemblies 10 can be formed having at least 2, 3, 4, 6, 8, 10 or more different sized stems for coupling with different sized fluid lines. Furthermore, although check valve assemblies 10C and 10D are shown having the first port fitting and the second port fitting each having a stem with the same diameter, it is appreciated that check valve assemblies 10 can be formed where the stems of the first port fitting and the second port fitting have different configurations. For example, check valve assembly 10E is formed having first port fitting 12 with the large diameter stem 26A and the second port fitting 14B with the small diameter stem 26B1. Other combinations and variations can also be used.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the invention as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain components and methods are described herein.

It will also be appreciated that systems, processes, and/or products according to certain embodiments of the present disclosure may include, incorporate, or otherwise comprise properties features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, processes, products, and the like are not described herein in particular detail in order to avoid obscuring aspects of the example embodiments. Such aspects are, however, also contemplated herein.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the disclosure or of the invention, which is defined in the appended claims. All changes which come within the meaning and range of equivalency of the claims are to be embraced within their scope.

What is claimed is:

1. A check valve assembly comprising:
    a first port fitting having a tubular stem with a passage extending therethrough;
    a second port fitting having a tubular stem with a passage extending therethrough;
    a base disposed between the first port fitting and the second port fitting, the base comprising an annular sleeve encircling a seat, the seat having a first side and an opposing second side with a central mounting hole passing therethrough and one or more flow channels passing therethrough;
    an umbrella valve comprising a flexible sealing disk having an outer surface and an opposing inner surface, a mounting stem extending from the inner surface of the sealing disk and projecting through the mounting hole of the base, an enlarged head being formed on the mounting stem so as to be disposed between the seat of the base and the second port fitting, the enlarged head having a diameter larger than a maximum diameter of the mounting hole of the base, the sealing disk being movable between a first position wherein at least a portion of the sealing disk sits on the first side of the seat of the base so as to cover the one or more flow channels and a second position wherein the sealing disk is resiliently flexed so as to at least partially uncover the one or more flow channels; and
    a retention plate disposed between the first port fitting and the seat of the base so that the retention plate sits against or adjacent to the outer surface of the sealing disk, the retention plate comprising a plate body having a first side and an opposing second side, the first side of the plate body sitting against or adjacent to the outer surface of the sealing disk, the retention plate further comprising a plurality of legs projecting from second side of the plate body so that the plurality of legs space the second side of the plate body away from the first port fitting.

2. The check valve assembly as recited in claim 1, wherein the retention plate terminates at an outer perimeter edge, a gap being formed between the outer perimeter edge of the retention plate and the first port fitting so that fluid flowing from the second port fitting to the first port fitting can pass through the gap.

3. The check valve assembly as recited in claim 2, wherein the passage of the tubular stem of the first port fitting has a maximum inner diameter and the outer perimeter edge of the retention plate has a maximum outer diameter, the maximum outer diameter of the retention plate being greater than the maximum inner diameter of the passage of the first port fitting.

4. The check valve assembly as recited in claim 1, wherein one or more flow paths pass through the plate body of the retention plate between the opposing sides thereof through which fluid can pass.

5. The check valve assembly as recited in claim 4, wherein the plate body of the retention plate extends to a perimeter edge, the one or more flow paths comprising one or more holes that pass through and are encircled by the plate body and/or one or more notches recessed into the perimeter edge of the plate body.

6. The check valve assembly as recited in claim 1, wherein the tubular stem of the first port fitting has a first end and an opposing second end with an annular flange outwardly projecting therefrom, the annular flange being secured to the annular sleeve of the base, each of the plurality of legs terminating at a free end that sits against or is disposed directly adjacent to an inside face of the annular flange of the first port fitting.

7. The check valve assembly as recited in claim 1, further comprising a blind hole extending into the outer surface of the sealing disk and into the mounting stem.

8. The check valve assembly as recited in claim 7, further comprising an alignment stem extending from first side of the plate body and into the blind hole of the umbrella valve.

9. The check valve assembly as recited in claim 1, wherein the first side of the retention plate is free of any projections outwardly extending therefrom.

10. The check valve assembly as recited in claim 1, wherein the passage of the stem of the first port fitting has a first maximum diameter and the passage of the stem of the second port fitting has a second maximum diameter, the first maximum diameter being different than the second maximum diameter.

11. The check valve assembly as recited in claim 1, further comprising:
a tube coupled to the first port fitting; and
a bioreactor or fermenter coupled to the tube.

12. The check valve assembly as recited in claim 1, wherein the retention plate is separate and discrete from the first port fitting, base, and umbrella valve and is not integrally formed with or fixedly secured to the first port fitting, base, or umbrella valve.

13. The check valve assembly as recited in claim 1, wherein the outer surface of the umbrella valve includes a flat platform against which the retention plate sits.

14. The check valve assembly as recited in claim 1, wherein at least a portion of the enlarged head sits directly against the second side of the seat of the base.

15. A method for operating the check valve assembly as recited in claim 1, the method comprising:
flowing a fluid stream from the second port fitting to the first port fitting so that the fluid stream flows through the one or more flow channels of the base and moves the sealing disk of the umbrella valve from the first position to the second position; and
stopping the flow of the fluid stream so that the sealing disk of the umbrella valve resiliently rebounds from the second position back to the first position, thereby preventing the fluid stream downstream of the umbrella valve from passing back through the one or more flow channels of the base.

16. A check valve assembly comprising:
a first port fitting having a passage extending therethrough;
a second port fitting having a passage extending therethrough;
a base comprising a seat having a central mounting hole passing therethrough and one or more flow channels passing therethrough, the base being disposed between the first port fitting and the second port fitting so that fluid flowing from the second port fitting to the first port fitting must pass through the one or more flow channels of the seat;
an umbrella valve comprising a flexible sealing disk having an outer surface and an opposing inner surface, a mounting stem extending from the inner surface of the sealing disk and projecting into the mounting hole of the base, the sealing disk being movable between a first position wherein at least a portion of the sealing disk sits on the seat of the base so as to cover the one or more flow channels and a second position wherein the sealing disk is resiliently flexed so as to at least partially uncover the one or more flow channels; and
a retention plate disposed between first port fitting and the seat so that the retention plate sits against or adjacent to the outer surface of the sealing disk, the retention plate terminating at an outer perimeter edge, a gap being formed between the outer perimeter edge and the first port fitting so that fluid flowing from the second port fitting to the first port fitting can pass through the gap, the retention plate comprising a plate body having a first side and an opposing second side with a central axis passing therebetween, one or more flow paths passing through the plate body between the opposing sides through which fluid can pass, the one or more flow paths being completely encircled by the retention plate and spaced apart from the gap and the central axis.

17. The check valve assembly as recited in claim 16, wherein the first side of the plate body sits against the outer surface of the sealing disk, the retention plate further comprising a plurality of legs projecting from second side of the plate body so that the plurality of legs space the second side of the plate body away from the first port fitting.

18. The check valve assembly as recited in claim 16, wherein the sealing disk covers the one or more flow paths when the sealing disk is in the second position.

19. A check valve assembly comprising:
a first port fitting having a passage extending therethrough;
a second port fitting having a passage extending therethrough;
a base having a seat with a central mounting hole passing therethrough and one or more flow channels passing therethrough, the base being disposed between the first port fitting and the second port fitting so that fluid flowing from the second port fitting to the first port fitting must pass through the one or more flow channels of the seat;
an umbrella valve comprising a flexible sealing disk having an outer surface and an opposing inner surface, a mounting stem extending from the inner surface of the sealing disk and projecting into the mounting hole of the base, the umbrella valve having a blind hole extending from the outer surface of the sealing disk and into the mounting stem, the sealing disk being movable between a first position wherein at least a portion of the sealing disk sits on the seat of the base so as to cover the one or more flow channels and a second position wherein the sealing disk is resiliently flexed so as to at least partially uncover the one or more flow channels; and a retention plate comprising a plate body having a first side and an opposing second side.

20. The check valve assembly as recited in claim 19, further comprising an alignment stem extending from the first side of the plate body and projecting into the blind hole of the umbrella valve.

21. A check valve assembly comprising:
a base comprising an annular sleeve encircling a seat, the seat having a central mounting hole passing therethrough and one or more flow channels passing therethrough;
a first port fitting having a first tubular stem bounding a passage extending between a first end and an opposing second end, a first annular flange outwardly projecting from the second end of the first tubular stem and being secured to a first end of the annular sleeve of the base;
a second port fitting having a second tubular stem bounding a passage extending between a first end and an opposing second end, a second annular flange outwardly projecting from the second end of the second tubular stem and being secured to a second end of the annular sleeve of the base so that the second port fitting is spaced apart from the first port fitting, the first tubular stem of the first port fitting having a different configuration than the second tubular stem of the second port fitting;
an umbrella valve comprising a flexible sealing disk having an outer surface and an opposing inner surface, a mounting stem extending from the inner surface of the sealing disk and projecting into the mounting hole of the base, the sealing disk being movable between a first position wherein at least a portion of the sealing disk sits on the seat of the base so as to cover the one or more flow channels and a second position wherein the sealing disk is resiliently flexed so as to at least partially uncover the one or more flow channels; and
a retention plate disposed between first port fitting and the seat of the base so that the retention plate sits against or adjacent to the outer surface of the sealing disk.

22. The check valve assembly as recited in claim 21, wherein the outer surface of the sealing disk of the umbrella valve includes a flat platform free of any projections outwardly extending therefrom and a frustoconical surface that encircles and extends radially outward from the flat platform and that slopes toward the seat of the base and away from the retention plate.

23. The check valve assembly as recited in claim 21, wherein the sealing disk of the umbrella valve terminates at an outer perimeter edge, the outer perimeter edge sitting directly against the seat of the base when the sealing disk is in the first position.

24. The check valve assembly as recited in claim 23, wherein the outer perimeter edge of the sealing disk is spaced apart from the seat of the base when the sealing disk is in the second position.

25. The check valve assembly as recited in claim 21, wherein the passage of the first tubular stem has a minimum inner diameter and the passage of the second tubular stem has a minimum inner diameter that is different from the minimum inner diameter of the first tubular stem.

26. The check valve assembly as recited in claim 21, further comprising:
the first port fitting including an annular hose barb encircling and radially outwardly projecting from the first end of the first tubular stem; and
the second port fitting including an annular hose barb encircling and radially outwardly projecting from the first end of the second tubular stem.

27. The check valve assembly as recited in claim 21, wherein the first port fitting and the second port fitting are both connected directly to the base.

* * * * *